US008504449B2

(12) United States Patent
Brown et al.

(10) Patent No.: US 8,504,449 B2
(45) Date of Patent: Aug. 6, 2013

(54) APPARATUS AND METHOD FOR MANAGING SOFTWARE APPLICATIONS OF A MOBILE DEVICE SERVER

(75) Inventors: William A. Brown, Woodstock, GA (US); Troy C. Meuninck, Newnan, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

(21) Appl. No.: 12/896,806

(22) Filed: Oct. 1, 2010

(65) Prior Publication Data
US 2012/0084186 A1    Apr. 5, 2012

(51) Int. Cl.
G07F 19/00     (2006.01)
H04M 15/00    (2006.01)

(52) U.S. Cl.
USPC ............... 705/34; 705/50; 705/51; 705/59; 705/67; 709/203; 709/219; 709/226

(58) Field of Classification Search
None
See application file for complete search history.

(56) References Cited

U.S. PATENT DOCUMENTS

| | | | |
|---|---|---|---|
| 5,761,421 A | 6/1998 | Van Hoff | |
| 6,938,156 B2 * | 8/2005 | Wheeler et al. | 713/170 |
| 7,412,727 B2 | 8/2008 | Kim | |
| 7,430,753 B2 | 9/2008 | Gray | |
| 7,492,899 B2 | 2/2009 | Qiao | |
| 7,634,076 B2 | 12/2009 | Lee | |
| 7,720,986 B2 | 5/2010 | Savoor | |
| 7,756,130 B1 | 7/2010 | Lee | |
| 8,015,253 B1 * | 9/2011 | Zapata et al. | 709/206 |
| 8,108,916 B2 | 1/2012 | Fink et al. | |
| 8,116,808 B2 | 2/2012 | Amine | |
| 2002/0157002 A1 * | 10/2002 | Messerges et al. | 713/155 |
| 2002/0184301 A1 | 12/2002 | Parent | |
| 2004/0253923 A1 | 12/2004 | Braley | |
| 2005/0010637 A1 * | 1/2005 | Dempski et al. | 709/204 |
| 2005/0044223 A1 | 2/2005 | Meyerson | |
| 2005/0251821 A1 | 11/2005 | Pina | |
| 2006/0098593 A1 | 5/2006 | Edvardsen et al. | |
| 2006/0123099 A1 | 6/2006 | Paila | |

(Continued)

OTHER PUBLICATIONS

B. Zimmerly, "A Tiny Cloud in Android—Exploring the Android File System from Your Browser", pp. 1-17, http://www.ibm.com/developeworks/opensource/library/os-tinycloud/index.htm, website last visited Oct. 1, 2010.

(Continued)

Primary Examiner — Fateh Obaid
(74) Attorney, Agent, or Firm — Guntin & Gust, PLC; Jay H. Anderson

(57) ABSTRACT

A system that incorporates teachings of the present disclosure may include, for example, a non-transitory computer-readable storage medium, which operates in a mobile device server and which has computer instructions to obtain a software application, store a first pairing key in a memory of the mobile device server where the first pairing key is generated by a device of a service provider in response to a review of the software application for compliance with at least one policy of the service provider, and execute a web server application at the mobile device server that is operable to detect a media resource center operably coupled with at least one media device, establish communications with the media resource center and transmit the first pairing key to the media resource center to enable at least a portion of services that are associated with the software application and that utilize the at least one media device. Other embodiments are disclosed.

16 Claims, 9 Drawing Sheets

U.S. PATENT DOCUMENTS

| | | | |
|---|---|---|---|
| 2006/0172700 A1* | 8/2006 | Wu | 455/41.2 |
| 2006/0193456 A1 | 8/2006 | Light et al. | |
| 2007/0019670 A1 | 1/2007 | Falardeau | |
| 2007/0022469 A1 | 1/2007 | Cooper | |
| 2007/0055783 A1 | 3/2007 | Gourraud | |
| 2007/0097860 A1 | 5/2007 | Rys | |
| 2007/0142036 A1 | 6/2007 | Wikman et al. | |
| 2008/0195406 A1 | 8/2008 | Matsumoto | |
| 2008/0320534 A1* | 12/2008 | Wang et al. | 725/100 |
| 2009/0031360 A1* | 1/2009 | Kidd et al. | 725/62 |
| 2009/0063193 A1* | 3/2009 | Barton et al. | 705/3 |
| 2009/0088197 A1* | 4/2009 | Stewart | 455/550.1 |
| 2009/0089183 A1* | 4/2009 | Afram et al. | 705/27 |
| 2009/0093237 A1 | 4/2009 | Levenshteyn | |
| 2009/0106366 A1 | 4/2009 | Virtanen et al. | |
| 2009/0171985 A1* | 7/2009 | Tischer | 707/100 |
| 2009/0193486 A1* | 7/2009 | Patel et al. | 725/114 |
| 2009/0288122 A1* | 11/2009 | Zellner et al. | 725/64 |
| 2009/0298514 A1 | 12/2009 | Ullah | |
| 2009/0327702 A1* | 12/2009 | Schnell | 713/155 |
| 2009/0328118 A1 | 12/2009 | Ravishankar | |
| 2009/0328228 A1* | 12/2009 | Schnell | 726/26 |
| 2010/0052853 A1* | 3/2010 | Hilton | 340/5.83 |
| 2010/0058398 A1 | 3/2010 | Ojala et al. | |
| 2010/0071021 A1 | 3/2010 | Friedman | |
| 2010/0076274 A1* | 3/2010 | Severson | 600/300 |
| 2010/0197238 A1* | 8/2010 | Pathuri et al. | 455/67.11 |
| 2010/0275249 A1 | 10/2010 | McCann et al. | |
| 2010/0328547 A1* | 12/2010 | Mayorga | 348/734 |
| 2011/0022522 A1 | 1/2011 | Sege | |
| 2011/0130118 A1 | 6/2011 | Fan | |
| 2011/0197264 A1 | 8/2011 | McDade | |
| 2011/0258437 A1* | 10/2011 | McKelvey et al. | 713/165 |
| 2012/0084834 A1 | 4/2012 | Brown | |

OTHER PUBLICATIONS

Opensource, "MWS:Rationale—A Website on a Mobile Personal Device is Different", pp. 1-4, http://wiki.opensource.nokia.com/projects/MWS:Rationale, website last visited Oct. 1, 2010.

Onathan Soroko, "Web Server on Your Cellphone—A New Design Space", Popular Logistics, Feb. 16, 2010, 4 pages.

Wikipedia, "Mobile Web Server", pp. 1-3, Page last modified Sep. 11, 2010.

Wikipedia, "Mobile Web Server (Symbian OS)", 1 page, http://en.wikipedia.org/wiki/Mobile_Web_Server_(Symbian_OS), website last visited Oct. 1, 2010.

Lin et al., "On Controlling Digital TV Set-Top-Box by Mobile Devices via IP Network", 8 pages, Proceedings of the Seventh IEEE International Symposium on Multimedia (ISM '05), Computer Society, 2005.

Linux Devices, "Intel 'Personal Server' Research: Mobile Computing in the Palm of your Hand", pp. 1-4, http://www.linuxfordevices.com/c/a/Linux-For-Devices-Articles/Intel-Personal-Server-res . . . , website last visited Oct. 1, 2010.

Toorani et al., "LPKI—A Lightweight Public Key Infrastructure for the Mobile Environments", pp. 162-166, IEEE 2008, ICCS 2008.

C. Davies, "i-Jetty Turns Android Cellphone Into Mobile Webserver", 6 pages, http://www.phonemag.com/i-jetty-turns-android-cellphone-into-mobile-webserver-031762 . . . , posted Mar. 17, 2008, website last visited Oct. 1, 2010.

* cited by examiner

600

APPARATUS AND METHOD FOR MANAGING SOFTWARE APPLICATIONS OF A MOBILE DEVICE SERVER

FIELD OF THE DISCLOSURE

The present disclosure relates generally to device communication and managing software applications of a mobile device server.

BACKGROUND

Media communication systems such as interactive television systems can deliver media content to media processors such as set-top boxes. Generally, media content can be broadcast by these systems and delivered according to a service subscription. These types of services can be associated with a subscriber and instantiated based on a subscriber profile and/or account.

In interactive media communication systems, users can also request services on demand. Portable media devices such as mobile phones can be adapted to communicate with media processors over a wireless medium.

DETAILED DESCRIPTION

Figure 1:
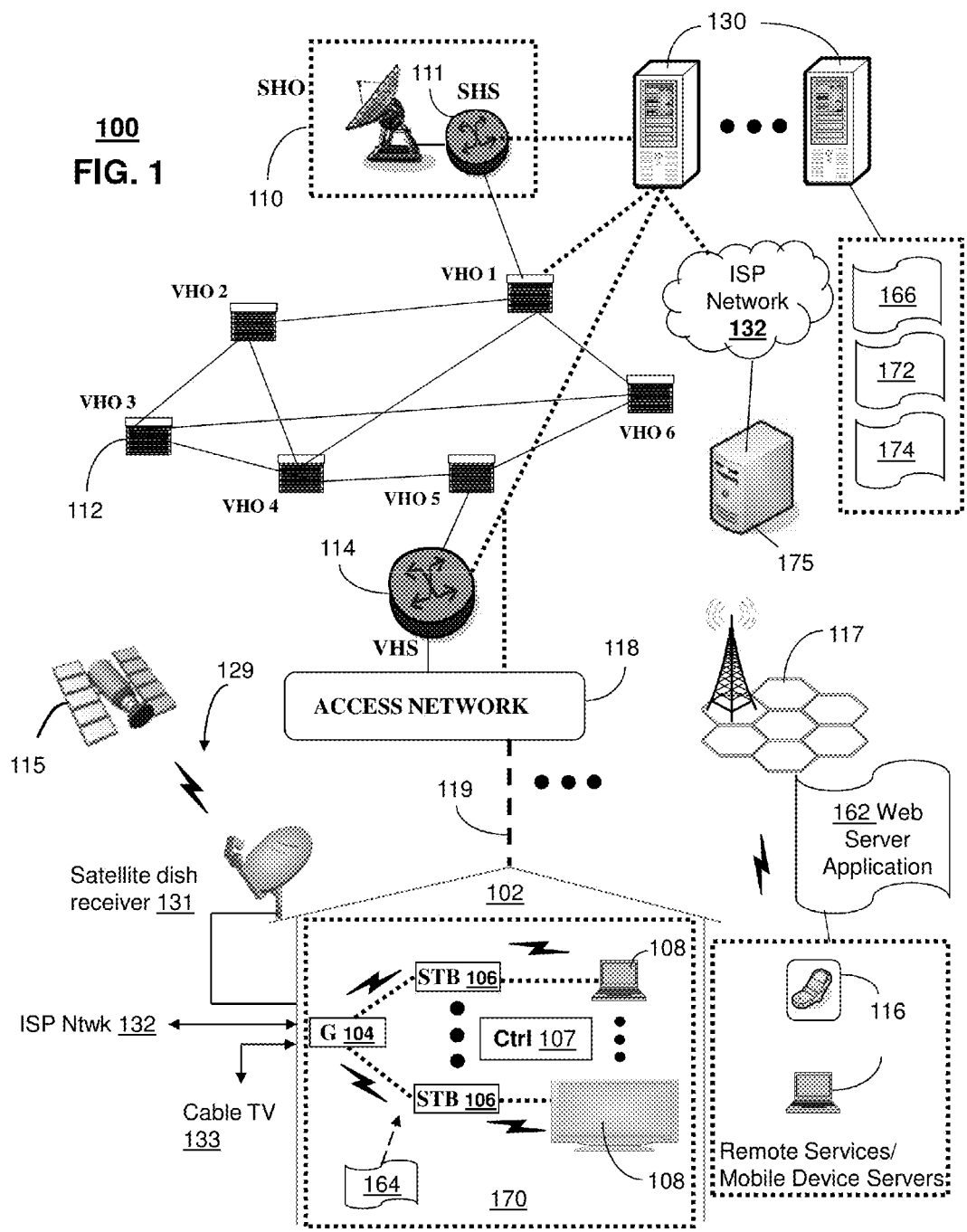
FIGS. 1-2 depict illustrative embodiments of communication systems that provide media services.

The present disclosure describes, among other things, illustrative embodiments of a mobile device server having a web server application to enable utilization of media resources of a media resource center. Pairing keys can be utilized to authenticate and/or control the functionality of software applications that are run on the mobile device servers. The use of pairing keys can limit the services provided by the software applications and/or limit the media resources that are usable with the software applications. For instance, certain pairing keys may give full access to software application services and/or resources, while another pairing key may give partial access to the same services and/or resources. The pairing keys can also be utilized to allow for review and approval of software applications that are created by third-party entities. Other embodiments are contemplated by the present disclosure as described below.

One embodiment of the present disclosure can include a portable communication device, which includes a controller to receive a software application and a first pairing key. The software application can be downloadable from a remote server. The first pairing key can be generated by a device of a service provider in response to a review of the software application for compliance with at least one policy of the service provider. Voice communications can be enabled on the portable communication device by equipment of the service provider. The controller can also execute a web server application in the portable communication device. The web server application can be operable to detect a media resource center when roaming in a communication zone of the media resource center, where the media resource center is operably coupled with at least one media device. The web server application can also be operable to establish communications with the media resource center and to transmit the first pairing key to the media resource center to enable at least a portion of services that are associated with the software application and that utilize the at least one media device.

One embodiment of the present disclosure can include a non-transitory computer-readable storage medium operating in a mobile device server. The storage medium can include computer instructions to obtain a software application and store a first pairing key in a memory of the mobile device server. The first pairing key can be generated by a device of a service provider in response to a review of the software application for compliance with at least one policy of the service provider. The storage medium can also include computer instructions to execute a web server application at the mobile device server. The web server application can be operable to detect a media resource center operably coupled with at least one media device, establish communications with the media resource center, and transmit the first pairing key to the media resource center to enable at least a portion of services that are associated with the software application and that utilize the at least one media device.

One embodiment of the present disclosure can be a method that includes receiving a software application from a third party vendor. The software application can be executable by a portable communication device, and the portable communication device can include an executable web server application for providing media services to at least one media device. The software application can implement at least one service to be used with the at least one media device. The method can also include reviewing the software application for compliance with at least one policy associated with a service provider, and generating a pairing key based on the reviewing of the software application. The pairing key can be utilized for authenticating the software application to be used with the at least one media device. The pairing key can be generated by a server.

FIG. 1 depicts an illustrative embodiment of a first communication system 100 for delivering media content. System 100 can have an approval center 175, which includes one or more service provider devices and/or personnel for reviewing and approving software applications, such as based on policies of the service provider or based on other policies. The software applications can be submitted for approval by third-party vendors that desire to provide their software applications to portable communication devices 108 and 116, such as for use with web server applications 162 of the portable communications device. As described below, the portable communication devices 108 and 116 can function as mobile device servers that utilize one or more resources of the building 102, such as resources under the control of a resource control manager 164. If the software application is approved, then the approval center 175 can generate a pairing key associated with the software application. The pairing key can be provided to the portable communication device 108 and 116 which executes the software application. The pairing key can also be transmitted to, or otherwise accessible by, the resource control manager 164. The pairing key can be utilized for authenticating the software application and controlling use of the resources (such as STB 106) by the software application, which is running on the portable communication device 108 and 116.

System 100 can also provide for all or a portion of computing devices 130 to function as a remote server (herein referred to as server 130). The server 130 can use computing and software technology 166 to perform the function of processing requests initiated by the web server application 162 operating in portable communication devices, such as those shown in reference 108 or 116 (herein referred to as a mobile device servers). Server 130 can also be used to control operations of the resource control manager 164 which can operate from the residential gateway 104, the media processor 106 or other computing devices in building 102 for managing resources of a media resource center 170. Another aspect of the server 130 can be a content provider system 172 which can be used for distributing media content to the communication devices of FIG. 1.

Yet another aspect of the server 130 can be a billing system 174 for billing a subscriber account when applications are requested by the mobile device servers and/or for billing the subscriber account when resources of the media resource center are requested by mobile device servers. The content provider system 172 and the billing system 174 can be managed by a service provider of the media communication system 100 of FIG. 1, or by third parties entities.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 that house a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline, or phone line wiring) or can operate over a wireless access protocol such as Wireless Fidelity (WiFi). By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services also.

It is contemplated that the present disclosure can apply to any present or next generation over-the-air and/or landline media content services system.

Some of the network elements of the IPTV media system can also be coupled to the one or more non-portable computing devices 130, a portion of which can operate as a web server for providing portal services over an Internet Service Provider (ISP) network 132 to the wireline media devices 108 or the wireless communication devices 116.

All forms of media services can be offered to media devices over landline technologies such as those described above. Additionally, media services can be offered to media devices by way of a wireless access base station 117 operating according to wireless access protocols such as Wireless Fidelity (WiFi), or cellular communication technologies (such as GSM, CDMA, UMTS, WiMAX, Software Defined Radio or SDR, and so on).

Illustrative embodiments of methods that can operate in portions of the aforementioned devices and systems of FIG. 1 are described below.

Figure 2:
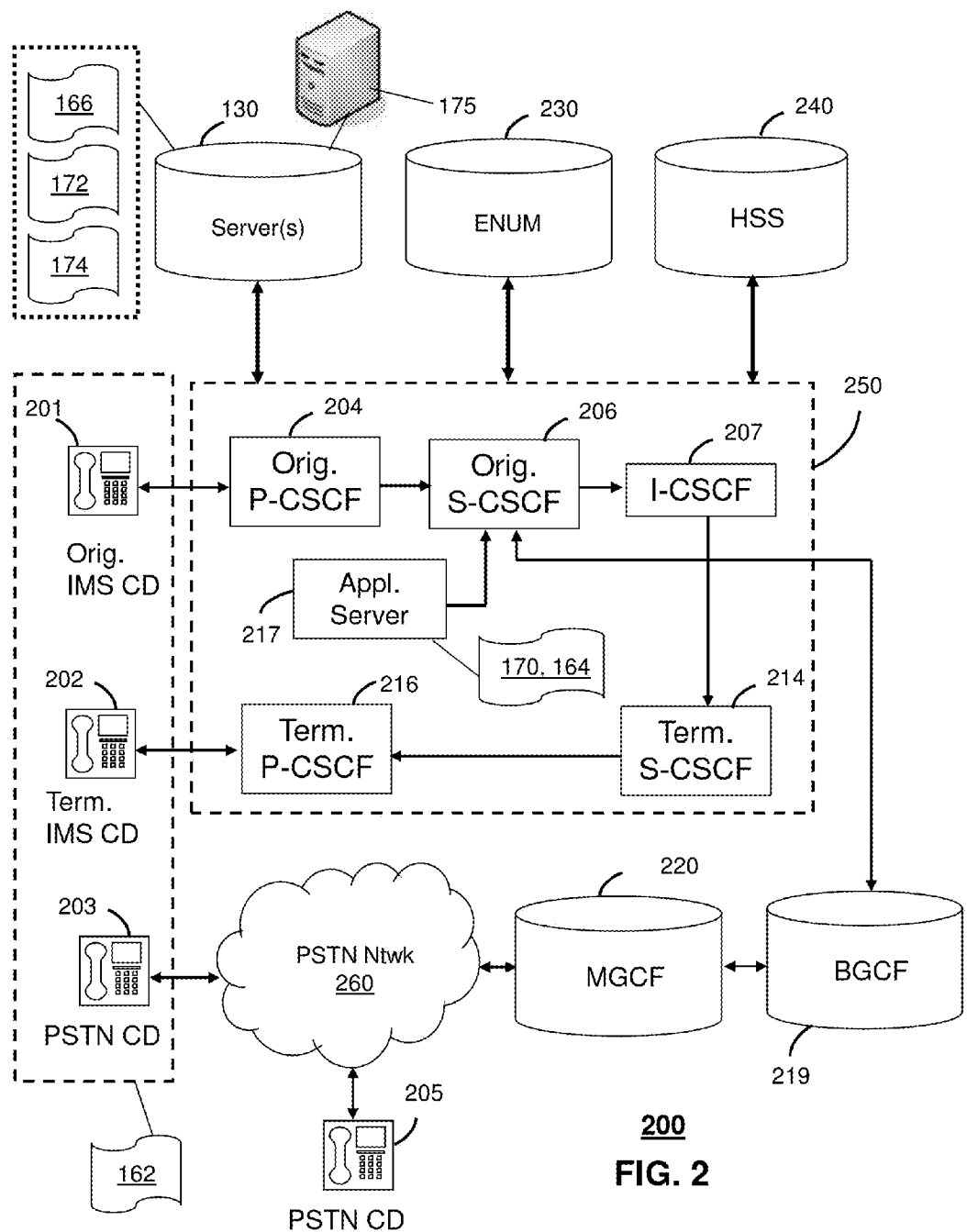

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. A communication session involving at least one PSTN CD utilizes the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 with the multimedia and Internet services of communication system 100.

System 200 can include or otherwise be coupled with computing devices 130 of FIG. 1 for purposes similar to those described above. Computing devices 130 can function as a remote server 166, content provider system 172, and billing system 174. It is further contemplated by the present disclosure that a web server application 162 can operate from any of the communication devices (e.g., references 201, 202, 203, and 205) depicted in FIG. 2. It is also contemplated that these devices can communicate with a resource control manager 164 operating from, for example, the AS 217, to gain access to resources of the media resource center 170. Illustrative embodiments of methods that can operate in portions of the devices of FIG. 2 are described below. System 200 can also be in communication with the approval center 175 so that pairing keys may be generated for authenticating or otherwise managing the use of software applications with a paired media resource.

Figure 3:
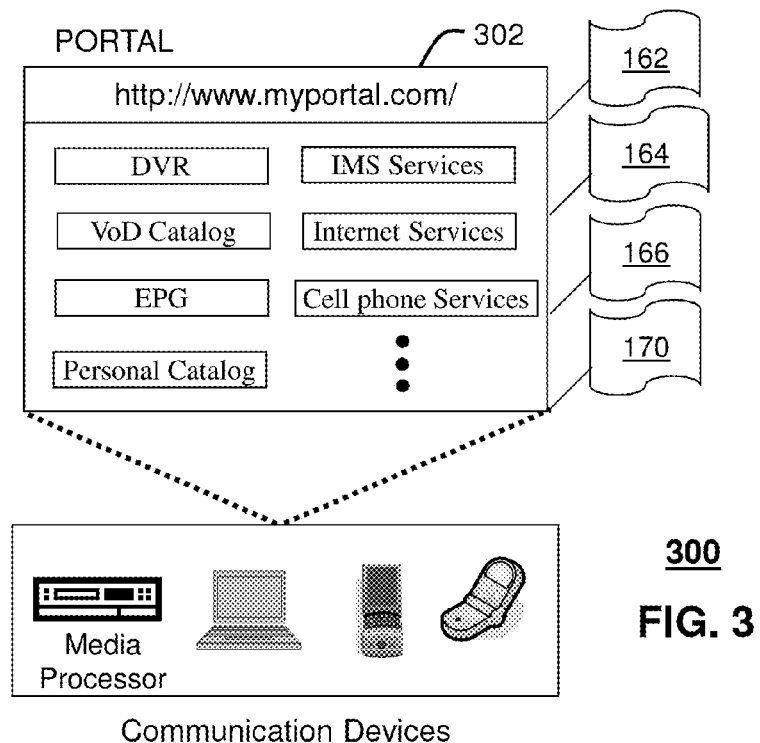
FIG. 3 depicts an illustrative embodiment of a portal that can interact with the communication systems of FIGS. 1-2.

FIG. 3 depicts an illustrative embodiment of a portal 302 which can operate from the computing devices 130 of the communication system 100 illustrated in FIG. 1. The portal 302 can be used for managing services of communication systems 100-200. The portal 302 can be accessed by a Uniform Resource Locator (URL) with a Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 302 can also be used for provisioning IMS services described earlier, provisioning Internet services, provisioning cellular phone services, and so on.

It is contemplated by the present disclosure that the portal 302 can further be utilized to manage and provision software applications 162, 164, 166, and 170 of a mobile device server, a resource control manager, a remote server, and a media resource center, respectively, as described earlier. Illustrative embodiments of methods that can operate in portions of the portal 302 of FIG. 3 are described below.

Figure 4:
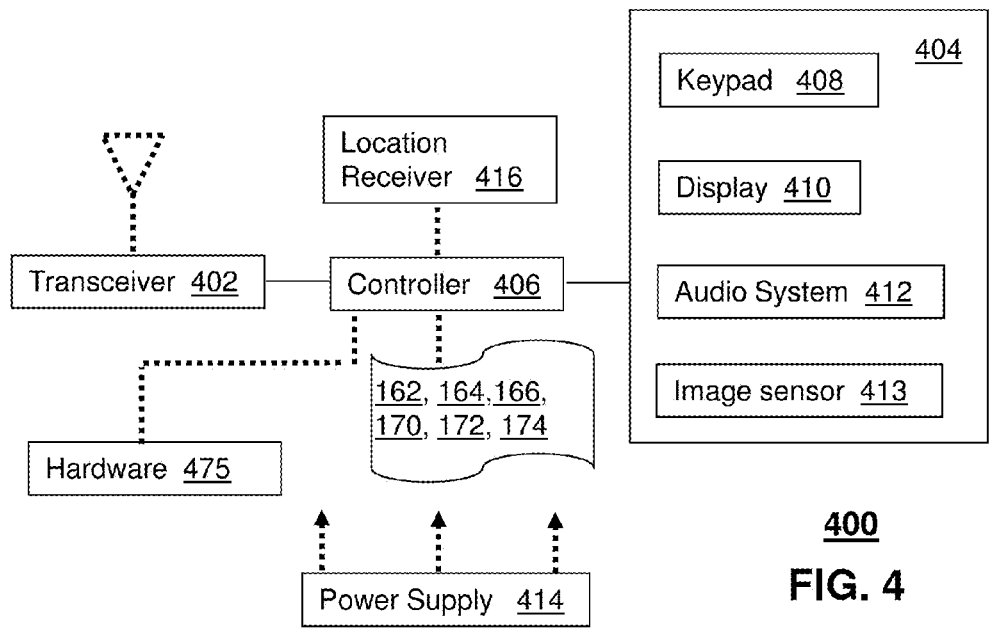
FIG. 4 depicts an illustrative embodiment of a communication device that can be utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying information to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize power management technologies such as replaceable and rechargeable batteries, supply regulation technologies, and charging system technologies for supplying energy to the components of the communication device 400 to facilitate long-range or short-range portable applications. The location receiver 416 can utilize location technology such as a global positioning system (GPS) receiver for identifying a location of the communication device 400 based on signals generated by a constellation of GPS satellites, thereby facilitating location services such as navigation.

The communication device 400 can use the transceiver 402 to also determine a proximity to a cellular, WiFi or Bluetooth access point by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a media resource center, a resource control manager, or a mobile device server, a media resource center, a remote server, a content provider, and a billing system. It follows from these illustrations that the controller 406 can be adapted in various embodiments to perform the functions 162, 164, 166, 170, 172, and 174 of the mobile device server, resource control manager, remote server, media resource center, content provider system, and billing system, respectively. Illustrative embodiments of methods that can operate in portions of the communication device 400 of FIG. 4 are described below.

In one embodiment, communication device 400 can include removable hardware 475 (e.g., a plug-in adapter) that can be utilized to facilitate the communication device's ability to function as a web server and/or to implement a software application(s) of the device. For instance, third party vendors that are not associated with the service provider of the communication device 400 and/or not associated with the manufacturer of the communication device, can provide the removable hardware 475 to be utilized with one or more software applications that utilize the web server functionality of the communication device, such as to pair with resources under coupled with the media resource center 164. As will be described again herein, pairing keys can be utilized to allow the communication device to implement each of the applications or implement portions of the application. For example, the pairing key can allow for authenticating the software application and/or media content that utilize the web server functionality of the communication device 400. The pairing key can be generated by the service provider of the systems of FIGS. 1-3.

The pairing key can be utilized by the service provider to prevent unauthorized use of software applications and/or media content with any of the resources (e.g., a media processor, a gaming console, etc.) supplied to subscribers of the service provider. The pairing key can become associated with a software application, including applications of third-parties, based on a review and approval process of the application performed by the service provider and/or by an entity designated for performing such a review. In one embodiment, the application review process can include an entity that is designated by the service provider to perform an initial review or analysis, which can be followed by a subsequent review performed by the service provider, such as based on information that is generated by the entity from their analysis.

The pairing key can be provided to the communication device 400 in various ways. For example, the pairing key can be downloaded with an approved application, such as for new applications. In another embodiment, the pairing key can be pre-loaded onto the communication device, such that upon downloading an approved application the pairing key is associated with the newly downloaded application. In another embodiment, the pairing key can be included in the removable hardware 475 which is utilized with the approved application. Other techniques for supplying a pairing key associated with an approved application are also contemplated, such as pairing keys being included in Subscriber Identity Module (SIM) cards.

Figure 5:
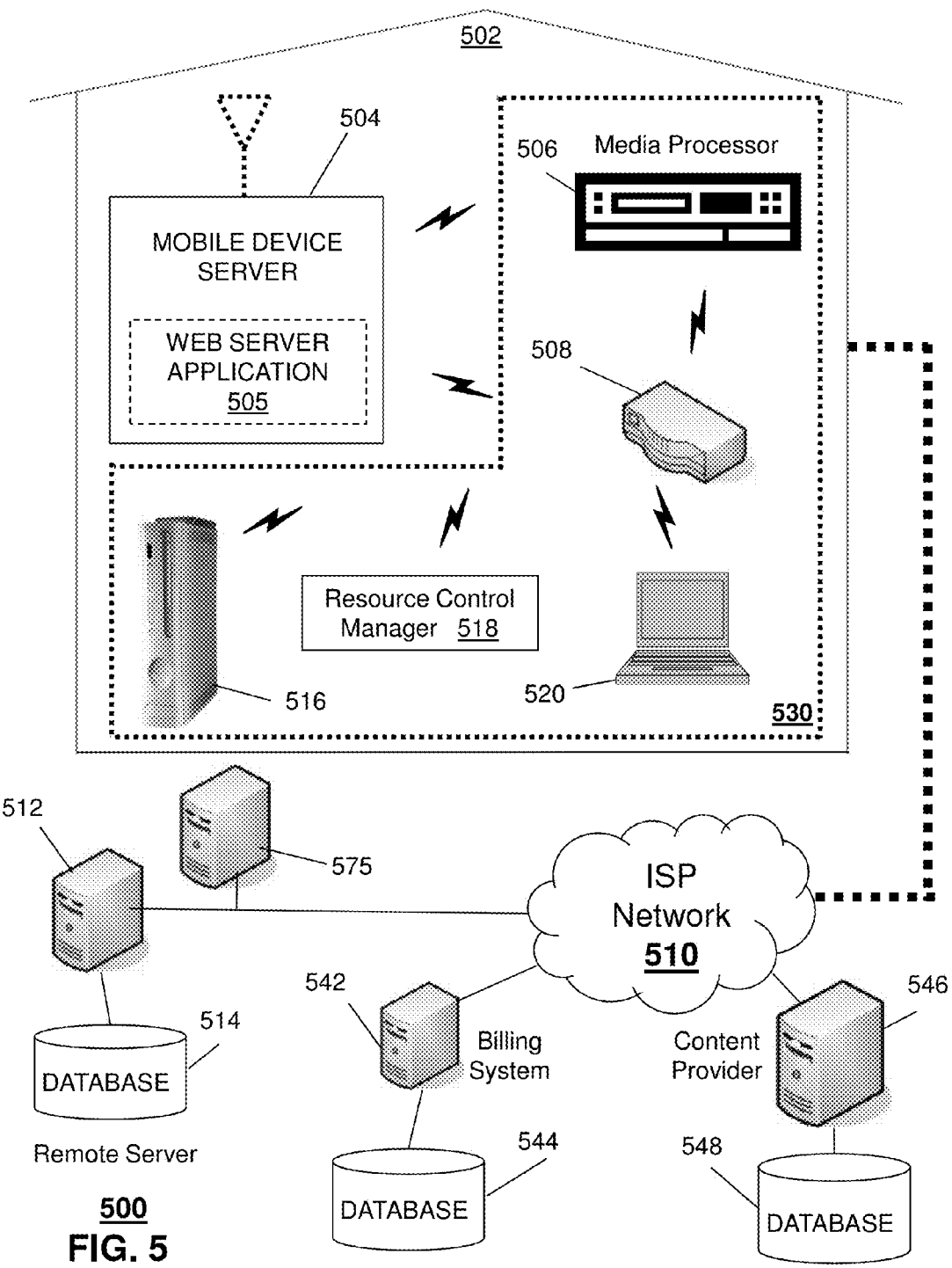
FIG. 5 depicts an illustrative embodiment of a system with computing and media resources.

FIG. 5 depicts an illustrative embodiment of a system 500 that can operate according to methods 600-900 described in FIGS. 6-9. System 500 can comprise a mobile device server 504 that can roam into a building 502 (residence or commercial establishment). The mobile device server 504 can represent a portable telephone such as a cellular telephone or a cordless telephone comprising in whole or in part the components of the communication device 400 shown in FIG. 4. The mobile device server 504 can be a portable telephony device which is capable of executing a web server application 505. Other embodiments of the mobile device server 504 such as a Personal Digital Assistant (PDA) (e.g., an iPAD™) adapted to execute a web server application 505 are contemplated by the present disclosure. For illustration purposes, the present disclosure will make references to the components shown in FIG. 4 when discussing the operations of the mobile device server 504.

A web server application 505 can represent a hypertext transfer protocol (HTTP) web server application 505 implemented in software, hardware or combinations thereof operating from the controller 406 of the mobile device server 504. A web server application 505 can also be represented by a web server application used by a server or hosting computer system. Accordingly, multiple types of web server application 505 operational in the mobile device server 504 are contemplated by the present disclosure.

System 500 can further include a media processor 506 and a gateway 508 that can provide wireless communication services to the media processor 506 and other devices in the building 502 such as a computing device 520, a gaming console 516, and a resource control manager 518. The resources in building 502 can collectively represent a media resource center 530. The resource control manager 518 can be a standalone computing device as shown in FIG. 5. In another embodiment, the resource control manager 518 can be an integral part of the gateway 508. In another illustrative embodiment, the functions of the resource control manager 518 can be distributed among several devices such as the gateway 508 and computing device 520. The resource control manager 518 can be utilized to manage usage of media and computing resources of the media resource center 530 by the mobile device server 504.

System 500 can also comprise an ISP network 510 that provides private and/or public Internet services to building 502. By way of the ISP network 510, the resource control manager 518 can communicate with a remote server 512 for purposes of managing resources made available to the mobile device server 504 as will be described below. A database 514 can be communicatively coupled to the remote server 512 to provide resource management services to one or more resource control managers 518 operating from a plurality buildings (only building 502 is shown in FIG. 5). The resource control manager 518 can be operable to access, by way of the ISP network 510, a billing system 542 communicatively coupled to a database 544. The billing system 542 can be utilized for applying charges to a subscriber account associated with the mobile device server 504. The billing system 542 can be managed by a service provider of the media communication systems 100-300 of FIGS. 1-3, or a third party having a commercial arrangement with the service provider of systems 100-300.

The mobile device server 504 can also be operable to access the ISP network 510 by way of gateway 508 or by way of a long-range wireless communication system such as a cellular or WiMAX communication system. The mobile device server 504 is thus operable to access the content provider system 546 to request content stored in database 548 in the form of software applications and/or media content that can be downloaded to the mobile device server 504 for presentation at the mobile device server 504 or by way of one or more of the media resources of the media resource center 530. When a software application and/or media content is downloaded to the mobile device server 504, a charge can be applied to a subscriber account.

System 500 can include an approval center 575 with one or more service provider devices and/or personnel for reviewing and approving software applications that third-party vendors desire to provide to the portable communication device 504. If the software application is approved, then the approval center 575 can generate or otherwise obtain a pairing key associated with the software application. The pairing key can be multiple pairing keys that are associated with different services of the software application and/or associated with different media resources that can be paired with the software application. The pairing key can be provided to the portable communication device 504 which executes the software application. The pairing key can also be transmitted to, or otherwise accessible by, the resource control manager 518. The pairing key can be utilized for authenticating the software application and controlling use of the resources (such as media processor 506 or gaming console 516) by the software application which is running on the portable communication device 504. The review process being performed by approval center 575 can be an automated analysis and/or a non-automated analysis of the software application. The review process of the service provider or an agent of the service provider can further rely, in whole or in part, upon information from an analysis of the software application performed by other entities.

FIGS. 6-9 depict illustrative embodiments of methods 600-900 that can be applied to the operations of portions of the systems and devices of FIGS. 1-5.

Method 600 depict an illustrative embodiment for subscribing to media services and for programming a mobile device server 504 with an identifier (such as a pairing key described below) that identifies the subscribed services. Method 600 can begin with step 602 in which a consumer subscribes to one or more services of a media service provider. The media service provider can offer consumers interactive media and communication services such as shown in FIGS. 1-2, interactive portal services such as shown in FIG. 3, and combinations thereof. Services offered by the service provider can include without limitation interactive TV (iTV) services, cellular phone services, Internet services, landline voice communication services, portal services, as well as other next generation media services.

A service provider can offer consumers grades of these services, which an agent of the service provider can record in step 604 in a subscriber-created account. For example a service provider can offer a plurality of grades of iTV services (e.g., basic channels, upgrade to sports channels, upgrade to premium movie channels, etc.). The service provider can also offer grades of services for cellular phone services (e.g., nationwide coverage, minute grades, data services, computer tethering services, etc.). Internet services can also be graded by speed, reliability, service and support (business vs. consumer grade), and so on. Landline voice services can also be graded by call plans such as nationwide call plans, local call plans, international call plans, etc. Portal services can also be graded according to the capability of the portal to access resources of the consumer, the ability to view media content as streamed data, the ability to share media content with friends and family, and so on.

Collectively, all grades of service can be identified by a single grade of service identifier (ID), or as a string of service grade IDs each identifying the grade of service of each service offered to a subscriber. Hence forth, the term service grade can represent a single service grade that collectively describes a family of service grades, or it can represent a sequence of service grades each describing a respective service.

Figure 6:
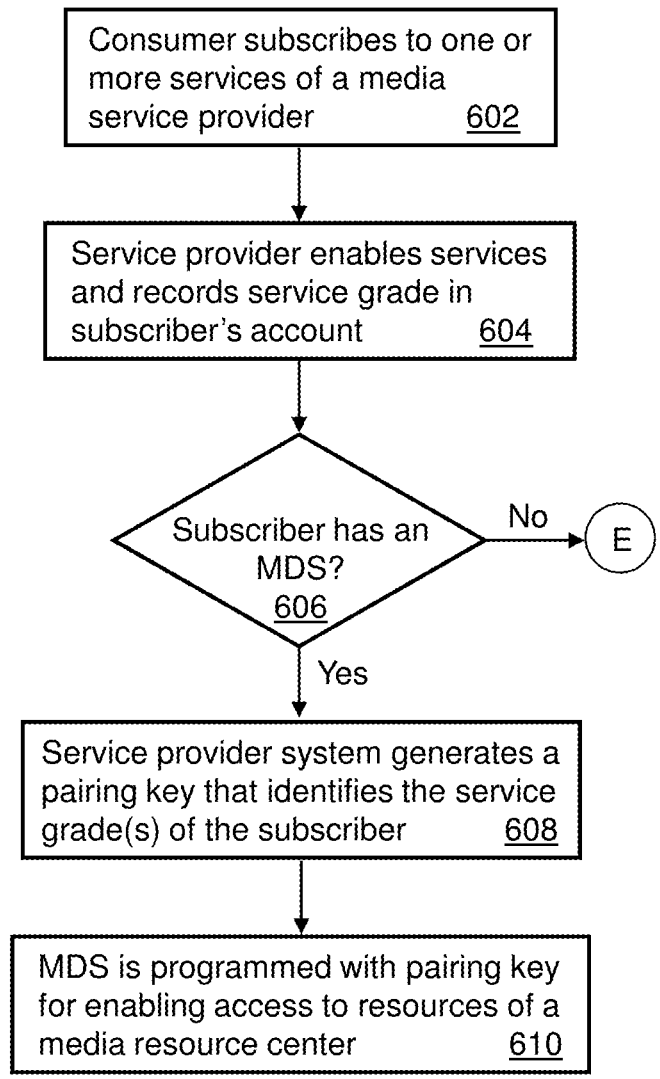
FIGS. 6-9 depict illustrative embodiments of methods operating in portions of the systems and components of FIGS. 1-5.

Referring back to step 606 of FIG. 6, if a service provider system (such as one of the computing devices 130 of FIG. 1) detects that the subscriber has a mobile device server 504, or a mobile device server 504 is offered to and accepted by the subscriber, the service provider system can proceed to step 608 where it generates a pairing key which can be used to identify the service grade(s) of the subscriber. The pairing key can be encrypted with proprietary technology, or can utilize public key infrastructure (PKI) technology. Alternatively, or in combination, the pairing key can comprise a personal identification number (PIN), user name and password, or other forms of secure verification technology. The pairing key can be programmed in the mobile device server 504 at step 610. The programming step can occur while the mobile device server 504 is provisioned at a retail store of the service provider, over the air by way of a cellular network, or over an Internet-capable wireline interface. For security purposes, the pairing key can be stored in a tamper-proof memory device such as a SIM card. If portability of the pairing key is undesirable, the pairing key can be stored in a tamper-proof memory device integrated in the mobile device server 504. Other tamper-proof storage techniques can be used.

Method 700 depicts an illustrative embodiment for acquiring software applications and/or content offered by a content provider system 546 (shown in FIG. 5) by way of a mobile device server 504. The content provider managing the content provider system 546 and the service provider managing the service provider system referred to in method 600 can be the same entity, or can be different entities. In one embodiment, the vendor of the software application can be a different entity, which is an independent third party that may or may not have a commercial affiliation with the service provider of the systems in FIGS. 1-3.

Method 700 can begin with an application approval sub-process 701. In this sub-process 701, software applications can be submitted for review and approval as in step 702. The reviewing of the software application can be performed by one or more entities, which can include the service provider and/or entities that are different from the service provider.

The application review can be based on compliance with one or more policies of the service provider. The policies can vary and can also incorporate policies of other entities, including rules, regulations or requirements promulgated by governmental or standards entities. For example, policies can dictate types of content that can be utilized by the software application; performance levels, such as minimum speed or maximum resource usage; and required functionality, such as GUI's having designated languages and/or audio capability.

Other policies of the service provider can also be applied during the review process, including policies that are dependent on geographic zones of use and/or dependent on devices that are intended to execute or otherwise interact with the mobile device server 504. The review of the software application can allow the service provider to verify that the software application has features that the service provider desires to have affiliated with the service provider's system.

Where the software application is not created by the service provider, the application review can be performed by the service provider and/or by one or more entities that are different from the service provider and different from the third-party vendor submitting the software application. In one embodiment, the entity can analyze the software application and can provide analysis information to the service provider which can then determine if the software application is in compliance with service provider policies based on reviewing the analysis information. In another embodiment, the service provider can review certain aspects of the software application and can review the analysis information of the entity for other aspects of the software application. The present disclosure also contemplates the one or more entities including standards bodies or other groups that review software applications for compliance with other policies, such as policies of a standards body. In this example, the service provider can review the analysis information from a standards body or other group which determines whether the software application complies with the other policies, and the service provider can also determine whether the software application also complies with the service provider's policies.

In one embodiment, review of the software application can be triggered based on a number of selections to download the software application by subscribers of the service provider satisfying a threshold. The service provider system can monitor downloading of the software application by mobile device servers 504 and can then implement the review process to approve the software application knowing that the software application is desired by a certain number of its subscribers. The monitoring can be performed based on download selection information associated with a service provider website or physical store and/or information provided by the media device servers which make a selection of the software application. In one embodiment, the downloaded software application can be only partially enabled until approved by the service provider. In another embodiment, the downloaded software application can be disabled until the approval process is completed by the service provider. In yet another embodiment, the subscriber can select the software application for download and can be notified that the software has not yet been approved and is thus partially or completely disabled. The software application can be obtained from a service provider store, such as a website or physical store, which provides software applications. In another embodiment, the software application can be obtained from a store, such as a website or physical store, of a third-party vendor.

If the software application is not approved in step 704, then method 700 can return to step 702 so that the third-party vendor can modify the software application if it desires to resubmit the software application for approval. If the software application is approved then in step 706 a pairing key can be generated for the software application. In one embodiment, the generated pairing key can be provided to the third-party vendor so that the vendor can distribute the pairing key when it distributes the software application, such as via a download from a website of the vendor. In another embodiment, the generated pairing key can be maintained by the service provider such that the pairing key must be obtained from the service provider or agent of the service provider when a software application has been distributed for use on a mobile device server 504. In this example, the service provider can distribute the pairing key each time the vendor and/or the user of the mobile device server 504 requests the pairing key for a downloaded software application, and this information can be used for billing purposes.

In another embodiment, a generated pairing key can be provided to a mobile device server 504 prior to the mobile device server receiving the software application. For instance, a mobile device server 504 can be provisioned with one or more pairing keys corresponding to one or more approved software application at the time of manufacture of the mobile device server. If a subscriber decides to obtain a particular software application that has been approved by the service provider then the pairing key can already be provisioned onto the mobile device server 504.

In one embodiment, the pairing key can be provided in hardware that is removably connected with the mobile device server 504, such as a SIM card. In this example, the SIM card can be provisioned with the pairing key in the event that the subscriber decides to obtain the software application. In another example, the SIM card can be updated with a pairing key for a newly added software application. In another embodiment, the removable hardware can be a device that is utilized by the software application and can include the pairing key stored therein. The mobile device server 504 can obtain one or more pairing keys for one or more approved software applications using various methods including each of the methods described above, as well as combinations of these methods.

In step 708, the content provider system 546 can present an assortment of applications/content to a mobile device server 504 by way of, for example, an Internet browser operating from the mobile device server 504. A user of the mobile device server 504 can browse through software applications as well as media content and make one or more selections by way of the UI 404 of the mobile device server 404. Software applications in the present context can mean executable software that can operate under the control of the web server application 505 operating in the mobile device server 504. The executable software can represent any type of software that can perform functions of interest to the user of the mobile device server 504. For example, a software application can represent client software that can be used to control the media processor 506, or the gaming console 516 in building 502. Media content can represent audio content, visual content, or combinations thereof. When a selection is made in step 710, the content provider system 546 can be adapted to extract the selected software application and/or content from database 548 and download a copy to the mobile device server 504 in step 712 over a wireless or a wireline interface. As described above, the download can include the pairing key or other means can be utilized for providing the corresponding pairing.

In step 714, the pairing key can be utilized for authentication and/or function limitation of the software application. The pairing key of method 600 differs from the pairing key of method 700. The pairing key referred to in method 700 can be used for authenticating the software application and/or media content, while the pairing key of method 600 can be used for authenticating the user of the mobile device server 504 and/or for defining service grade(s) of services that a user of the mobile device server 504 has subscribed to. Both pairing keys can be generated by the service provider of the systems of FIGS. 1-3. In one embodiment, the pairing key of method 700 can be utilized by the service provider to prevent unauthorized use of software applications and/or media content with any of the resources (e.g., media processor 506, gaming console 516, etc.) supplied to subscribers of the service provider.

Figure 7:
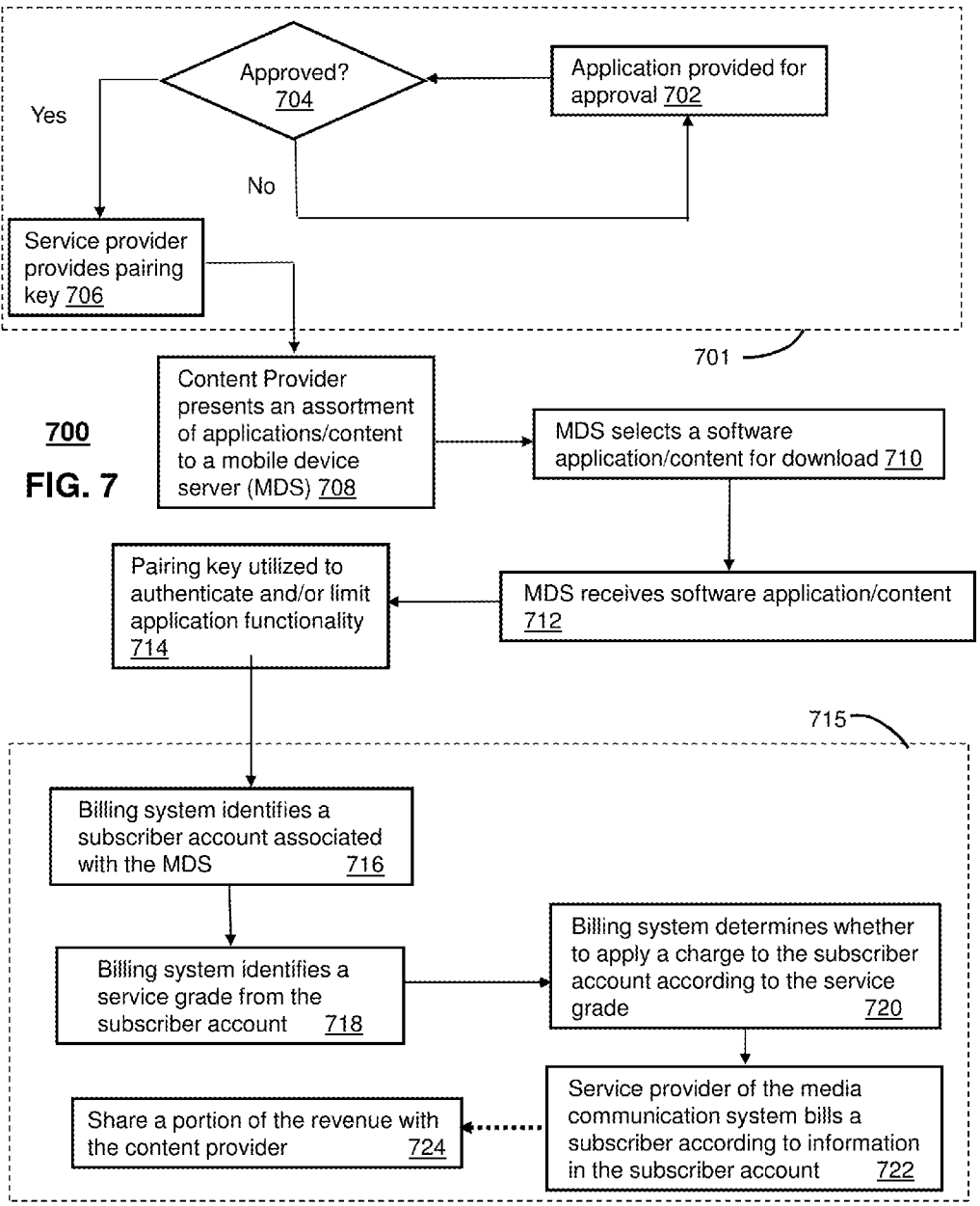
Figure 8:
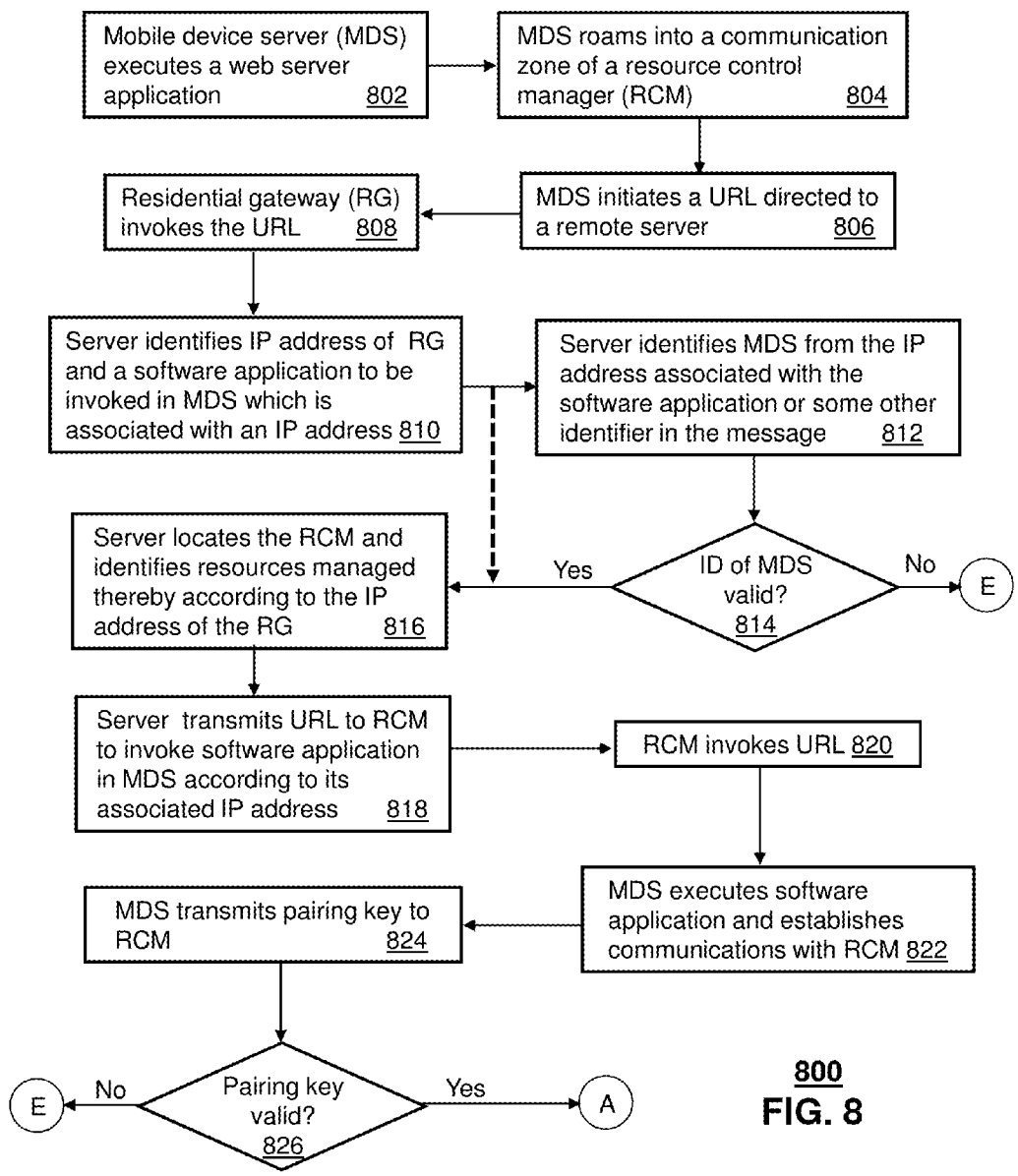
Figure 9:
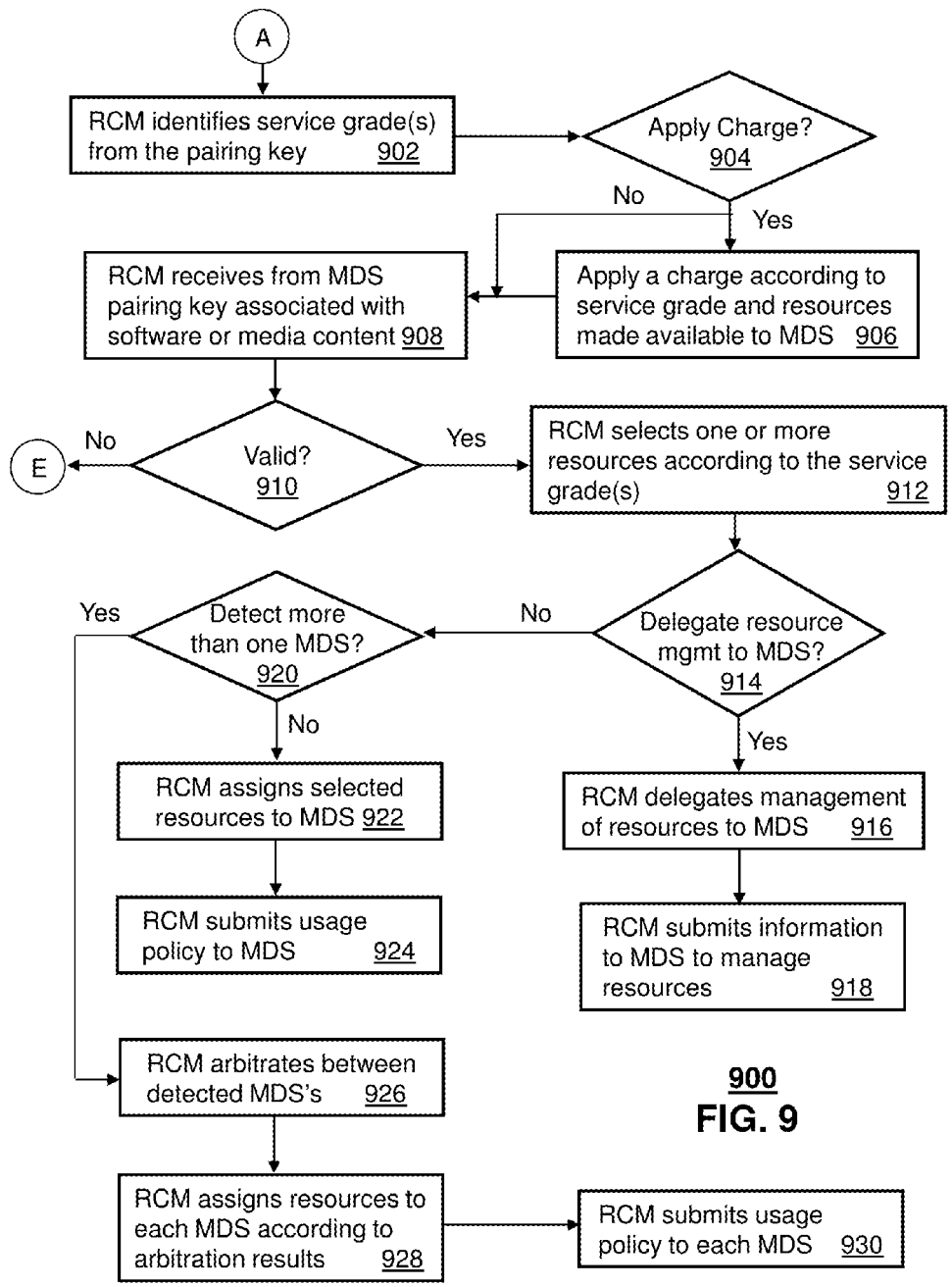

Referring back to the steps of method 700 in FIG. 7, once the software application and/or media content has been downloaded to the mobile device server 504 at step 712, the billing system 542 of FIG. 5 can be adapted to perform a billing sub-process 715. In step 716, a subscriber account associated with the mobile device server 504 can be identified and in step 718 a service grade (or grades) from the information retrieved from the subscriber account can be identified. At step 720, the billing system 542 can be further adapted to determine whether to apply a charge to the subscriber account according to the service grade(s). For example, the service provider can have a service grade in which the subscriber can download unlimited software applications or media content without a charge. A different service grade may allow some types of software applications and/or media content to be downloaded free of charge, while for others the subscriber would be charged a fee. It is contemplated that the service provider of the systems of FIGS. 1-3 can define multiple service grades each with differing fee policies.

If at step 720 the billing system 542 determines from the service grade that a charge is to be applied to the subscriber's account, then the billing system 542 proceeds to step 722 where it applies a charge to the subscriber's account. If the content provider system 546 is managed by a third party having a commercial arrangement with the service provider, then the billing system 542 can also be adapted at step 724 to share a portion of the revenue from the charge applied to the subscriber account with the content provider. If the content provider and the service provider are the same entity, then step 724 can be skipped.

It is contemplated that method 700 can be modified in numerous ways to accomplish the same or similar tasks. For instance, sharing a portion of the charges applied to subscriber accounts with the content provider can be implemented by other systems of FIGS. 1-3. For example, the content provider system 546 can be adapted to apply charges to a subscriber's account which in turn triggers systems of the service provider to submit an electronic payment to the content provider. The electronic payment can represent a portion of revenue from the charged subscriber fees in accordance with a commercial arrangement between the service provider and the content provider. It is further contemplated that in this arrangement the subscriber can be made to believe that the content provider and the service provider are one and the same since the subscriber only sees billing statements from the service provider with no indication that the content provider is a third party having a commercial arrangement with the service provider.

In one embodiment, a software application can have multiple pairing keys associated with it. Each of the pairing keys can provide a different level of service and/or different billing criteria. For example, a software application can include multiple services that are used with one or more of the resources of the resource control manager 518, such as media processor 506 and gaming console 516. Different pairing keys can allow for use of different services among the multiple services. The pairing key can be used to determine and enable use of select services and deny use of the remaining services. In one embodiment, one of the pairing keys can provide unlimited functionality of the software application, such that all services of the multiple services provided by the software application are enabled for use with the resources of the resource control manager 518. In another embodiment, the different pairing keys can enable use of the software application services with different resources of the resource control manager 518. For example, one of the pairing keys can enable use of the software application implemented on the media device server 504 with the media processor 506 while denying access by the media device server to the remaining resources, such as the gaming console 516. The different pairing keys can also provide different levels of services in combination with different access to resources by the media device server 504.

In one embodiment, the different pairing keys can allow for different billing criteria. For instance, one of the pairing keys can identify a subscriber plan that includes unlimited use at a fixed fee, while another of the pairing keys can identify a subscriber plan that bills based on the application service and/or resources that are utilized, and/or based on the amount of time for which they are used.

Methods 800-900 depict illustrative embodiments in which a mobile device server 504 acquires access to resources in the media resource center 530 of building 502.

Method 800 begins with step 802 in which the mobile device server 504 of FIG. 5 executes a web server application 505. Step 802 can be initiated by a user manipulating the user interface of the mobile device server 504. Alternatively, the web server application 505 can be automatically initiated by other triggers such as time of day, a user profile, or combinations thereof. The web server application 505 in the mobile device server 504 can be operable to detect in step 804 a resource control manager 518 when roaming into a communication zone of the resource control manager 518. The communication range of the communication zone can be driven by the wireless service and technology characteristics of the gateway 508. Step 804 can represent the web server application 505 of the mobile device server 504 scanning for media resources in building 502 by way of gateway 508 providing access to a wireless network. The gateway 508 can be a WiFi router and modem combination which is communicatively coupled to the ISP network 510 by way of a wired interface such as a coaxial cable or telephone wire interface.

The web server application 505 of the mobile device server 504 can scan for the presence of media resources such as the media processor 506 by requesting information from the resource control manager 518. The resource control manager 518 can transmit to the mobile device server 504 a list of the active devices on the WiFi network. Alternatively, or in combination, the web server application 505 of the mobile device server 504 can transmit a broadcast message on the WiFi network requesting identification of the devices communicatively coupled to the WiFi network. Other identification techniques are contemplated by the present disclosure.

Once the resource control manager 518 has been discovered, the web server application 505 can present the detected media resource(s) to a user over the UI 404 of the mobile device server 504. The user can manipulate the UI 404 as previously described to indicate a desire to establish communications with the resource control manager 518. Alternatively, or in combination, a need to establish communications with the resource control manager 518 can be detected from a prior history of user actions, a profile established by the user of the mobile device server 504 indicating a preference for establishing communications with the resource control manager 518, or other triggers that may be definable by user behavior or user-established settings.

In step 806, the web server application 505 in the mobile device server 504 can initiate a URL directed to the remote server 512 by way of the gateway 508. The following is an illustrative embodiment of a URL that can be initiated by the mobile device server 504: http://someServer.com/ launchApp?special_app=http://<IP address of MDS x.x.x.x>/mrml.xml. The URL can include a domain name of the remote server 512 and instructions to launch a specific software application executable by the web server application 505 in the mobile device server 504. The URL can also include an IP address of the mobile device server 504 which can be used to launch the software application. In step 808, the gateway 508 can attach localization information in the form of header information into an IP header source for network address translation or an HTTP header prior to forwarding the URL to the remote server 512.

The server 512 can receive the URL message by way of the ISP network 510 of FIG. 5. The server 512 can in turn identify in step 810 from the HTTP header the IP address of the gateway 508. The server 512 can also identify from the URL message the software application to be invoked by the mobile device server 504 (e.g., special_app_to_enable_comm_with_resource_ctrl_mgr), and the IP address associated with the software application which can be used to identify the software application and/or the mobile device server 504.

In step 812, the remote server 512 can authenticate the request from the mobile device server 504 using the IP address of the mobile device server 504 or some other identifier added to the URL message (e.g., MAC address of the mobile device server 504). If the server 512 does not recognize the mobile device server 504 in step 814, method 800 can cease. Otherwise, if authentication is successful, the server 512 can proceed to step 816. Authentication of the mobile device server 504 can be delegated to the resource control manager 518, in which case steps 812 and 814 may be bypassed.

At step 816, the server 512 can be operable to locate the resource control manager 518 and media resources managed thereby according to the detected IP address of the gateway 508. The server 512 can locate the resource control manager 518 from a look-up table in a database 514 operating, for example, as a Domain Name Server (DNS), a subscriber database, or combinations thereof. Once the resource control manager 518 and resources managed thereby have been identified, the server 512 can transmit to the resource control manager 518 in step 818 a new URL message to invoke the software application in the mobile device server 504 according to the IP address of the mobile device server 504. The following is an illustrative embodiment of a URL message that can be transmitted to the resource control manager 518: http://<IP address of MDS x.x.x.x>/mrml.xml.

Once the resource control manager 518 invokes this URL in step 820, the web server application 505 in the mobile device server 504 can be operable to execute the software application (special_app_to_enable_comm_with_resource_ctrl_mgr) in step 822 to establish an initial state of communications with the resource control manager 518. Authentication of the mobile device server 504 can take place in steps 824-826 prior to enabling communication services between the mobile device server 504 and resources managed by the resource control manager 518. In step 824, the mobile device server 504 can transmit authentication data to the resource control manager 518. The authentication data can comprise, for example, the pairing key of method 600 programmed in the mobile device server 504 by the service provider at step 610. As noted earlier, the pairing key can be encrypted data, a PKI key, a PIN, user name and password, or other forms of secure verification technology. The pairing key can be utilized to prevent mobile device servers 504 from utilizing media resources of the communication systems of FIGS. 1-3 unless authorized by the service provider of these systems.

If the authentication data is invalid or not recognized, method 800 ceases at step 826 and may submit an error message to the user of the mobile device server 504 (e.g., "You are not authorized to pair your device with the media resources in this residence"). Otherwise, the resource control manager 518 proceeds to step 902 of FIG. 9 where it identifies service grades from the pairing key. The resource control manager 518 can maintain a database of pairing keys and their corresponding service grade(s) from prior interactions, or can submit a request to a server of one of the communication systems of FIGS. 1-2 or FIG. 5 (such as server 512 or billing system 542) to request an identification of the service grade(s) assigned to the mobile device server 504 according to the supplied pairing key. The service grade(s) can identify the extent of services offered to the mobile device server 504, and the resources that can be made available to the mobile device server 504 in building 502.

Suppose, for example, that a service provider offered three service grades branded as Platinum, Gold or Bronze. Platinum services can for example represent all media services and resources (e.g., computer 520, media processor 506, and gaming console 516) which can be made available to the mobile device server 504. Gold services can represent less services and resources than Platinum services, but more services and resources than Bronze. The service provider of the communication systems of FIGS. 1-3 can utilize more complex service schemes by defining subservice levels of a particular service category. For example, Platinum services can have sublevel service grades for the media processor 506 (e.g., premium channels vs. basic channels), the gaming console 516 (e.g., unlimited access to games vs. a limited subset of games with the option to purchase others in an on-demand model), and the computing device 520 (e.g., various levels of access to CPU resources, and memory storage). Thus, any form of service grades can be defined by the service provider.

Once the service grade(s) have been identified, the resource control manager 518 can supply the pairing key to, for example, the billing system 542 and inform the billing system 542 that the mobile device server 504 has requested certain resources of the media resource center 530. Based on the resources requested by the mobile device server 504 and the service grades associated with the mobile device server 504 (identifiable by the pairing key), the billing system 542 can be adapted to determine at step 904 whether to apply a charge for providing the mobile device server 504 with access to the requested resources. If the service grade(s) allow for free access to the resources in building 502 then step 906 can be skipped. Otherwise, the billing system 542 can be adapted to apply a charge at step 906 to a subscriber account associated with the mobile device server 504 according to the resources requested by the mobile device server 504.

At step 908, the mobile device server 504 can be adapted to provide the resource manager 518 with the pairing key of the software application and/or media content that the mobile device server 504 wants to utilize in association with the requested resources. For example, the mobile device server 504 may have a software application which may require the use of the gaming console 516 or the media processor 506. Alternatively, or in combination, suppose the mobile device server 504 would like to transfer or process media content (e.g., a movie downloaded from the content provider system 546) at the media processor 506. In both instances, the pairing key supplied to the resource control manager 518 at step 908 can be used to authenticate the software application and/or the media content as being pre-screened and approved by the service provider.

The resource control manager 518 can have a history of pairing keys associated with software and/or content from prior interactions, or can contact the remote server 512 to determine if the pairing key supplied by the mobile device sever 504 is valid. The remote server 512 can have in its database 514 a copy of all the pairing keys supplied to the content provider system 546 in order to validate the use of a software application and/or media content with the media resource center 530 of building 502. If the remote server 512 validates the pairing key at step 910, the resource control manager 518 can proceed to step 912, otherwise it terminates interactions with the mobile device server 504. An error message can then be submitted to the user of the mobile device server 504 (e.g., "You are not authorized to use the software application XXX or media content YYY with the resources in this residence").

If the pairing key is valid, then the resource control manager 518 at step 912 selects one or more resources which can be utilized by the mobile device server 504 according to the service grade(s) assigned thereto. In step 914, the resource control manager 518 can also delegate management of the selected resources to the mobile device server 504 based on the service grade(s). In this embodiment, the mobile device server 504 can be authorized to manage the selected resources without interference by the resource control manager 518. If delegation is appropriate, the resource control manager 518 can inform the mobile device server 504 in step 916 that it is delegating management of the selected resources to the mobile device server 504.

To assist the mobile device server 504, the resource control manager 518 can transmit to the mobile device server 504 in step 918 information associated with delegated services to assist the mobile device server 504 in managing these services. The information can include provisioning data, service provider and subscriber usage policies, telemetry data, and other suitable information for managing these resources. Provisioning data can represent an identification of services enabled and available for use by the mobile device server 504. Service provider usage policies can define how these resources can be used by the mobile device server 504 and other devices managed by the mobile device server 504.

For example, a service provider usage policy can identify digital rights management policies, Quality of Service policies, bandwidth management policies, and so on. Subscriber policies can represent subscriber usage preferences such as media content preferences, usage policies (time of day, blocked periods, parental controls, etc.), load management policies, and so on. Subscriber policies can be established through the portal services described in FIG. 3. For example, a web page can be presented to a subscriber which identifies a list of customizable options to establish a resource management policy to be followed by the resource control manager 518 when enabling or delegating services to a mobile device server 504.

Referring back to step 914, if delegation is not appropriate according to the service grade(s) of the subscriber, the resource control manager 518 can proceed to step 920 where it determines if other mobile device servers 504 are present in the network established by the gateway 508. If only one mobile device server 504 is present, the resource control manager 518 can proceed to step 922 where the resource control manager 518 assigns the selected resources to the mobile device server 504. In step 924, the resource control manager 518 can transmit to the mobile device server 504 a usage policy summarizing the service provider and subscriber usage policies previously described. From this point forward, the mobile device server 504 can begin to utilize the resources assigned in step 922.

Referring back to step 920, if the resource control manager 518 detects that more than one mobile device server 504 is requesting the same resources, the resource control manager 518 can proceed to step 926 where it can arbitrate between the detected mobile device servers 504. The arbitration process can prompt each user of the mobile device servers 504 to make concessions. Alternatively, or contemporaneously, the resource control manager 518 can address arbitration on the basis of the mobile device server 504 with the higher service grade (or sublevels of service grades). It is contemplated that any arbitration technique can be applied in step 926. Once arbitration has been completed, the resource control manager 518 can proceed to step 928 where the resource control manager 518 assigns resources to each mobile device server 504 according to the arbitration results. The assignment can represent a distribution of resources with or without sharing of such resources. That is, some resources might be shared between multiple mobile device servers 504 (e.g., a media processor 506) while others can be assigned exclusively to one of the mobile device servers 504 (e.g., gaming console 516). In step 930, the resource control manager 518 can transmit to each mobile device server 504 a usage policy as previously described for the arbitrated resources.

The present disclosure contemplates a mobile device server 504 that among other things can be programmed with a pairing key that can be used to identify service grades of services that a user of the mobile device sever has subscribed to. Additional pairing keys can be used to enable a service provider to manage which applications and/or content a mobile device server 504 can be used with the resources of a media resource center 530. The mobile device server 504 can be adapted to detect media resources managed by the resource control manager 518 and to acquire access to all or a portion of such resources according to the illustrative embodiments of methods 800-900 of FIGS. 8-9. By mobilizing a web server application 505 by way of a mobile device server 504 as described above it may no longer be necessary for media resources to be managed solely by way of infrastructure devices such as those shown in FIGS. 1-3, which are generally not portable. As result, infrastructure resources can be preserved thereby reducing infrastructure costs.

Upon reviewing the aforementioned embodiments, it would be evident to an artisan with ordinary skill in the art that said embodiments can be modified, reduced, or enhanced without departing from the scope and spirit of the claims described below. For example, methods 800-900 can be adapted so that a mobile device server 504 can communicate with other mobile device servers 504. In this configuration, one of the mobile device servers 504 can function in part as the resource control manager 518 in a master-slave configuration. The mobile device server 504 operating as the resource control manager 518 can assign and/or delegate services according to the service grade of the requesting mobile device server 504.

In one embodiment, FIG. 5 can be adapted so that the resource control manager 518 is located remotely from building 502. In another embodiment, the resource control manager 518 can be an integral part of remote server 512, or can operate from a computing device that is communicatively coupled to the remote server 512. In another embodiment, the resource control manager 518 can be adapted to offer the mobile device server 504 resources which are remote from a vicinity of building 502. The remote resources can be in one or more other buildings or distributed in the networks of FIGS. 1-3. The remote resources can include without limitation computing resources, storage resources, media processing resources, or other resources which can be made accessible to a mobile device server 504. In yet another embodiment, the resource control manager 518 can be adapted to communicate with other resource control managers 518 located in the networks of FIGS. 1-3 or other residential or commercial buildings remote from building 502. In this embodiment, a resource control manager 518 can request and/or exchange resources with other resource control managers 518 to expand the reach and access of resources made available to mobile device servers 514.

In another embodiment, the subscriber accounts can be used to index, categorize and/or characterize services, and can also maintain user associations with pairing-key(s) and/or grades of service.

Other suitable modifications can be applied to the present disclosure without departing from the scope of the claims below. Accordingly, the reader is directed to the claims section for a fuller understanding of the breadth and scope of the present disclosure.

Figure 10:
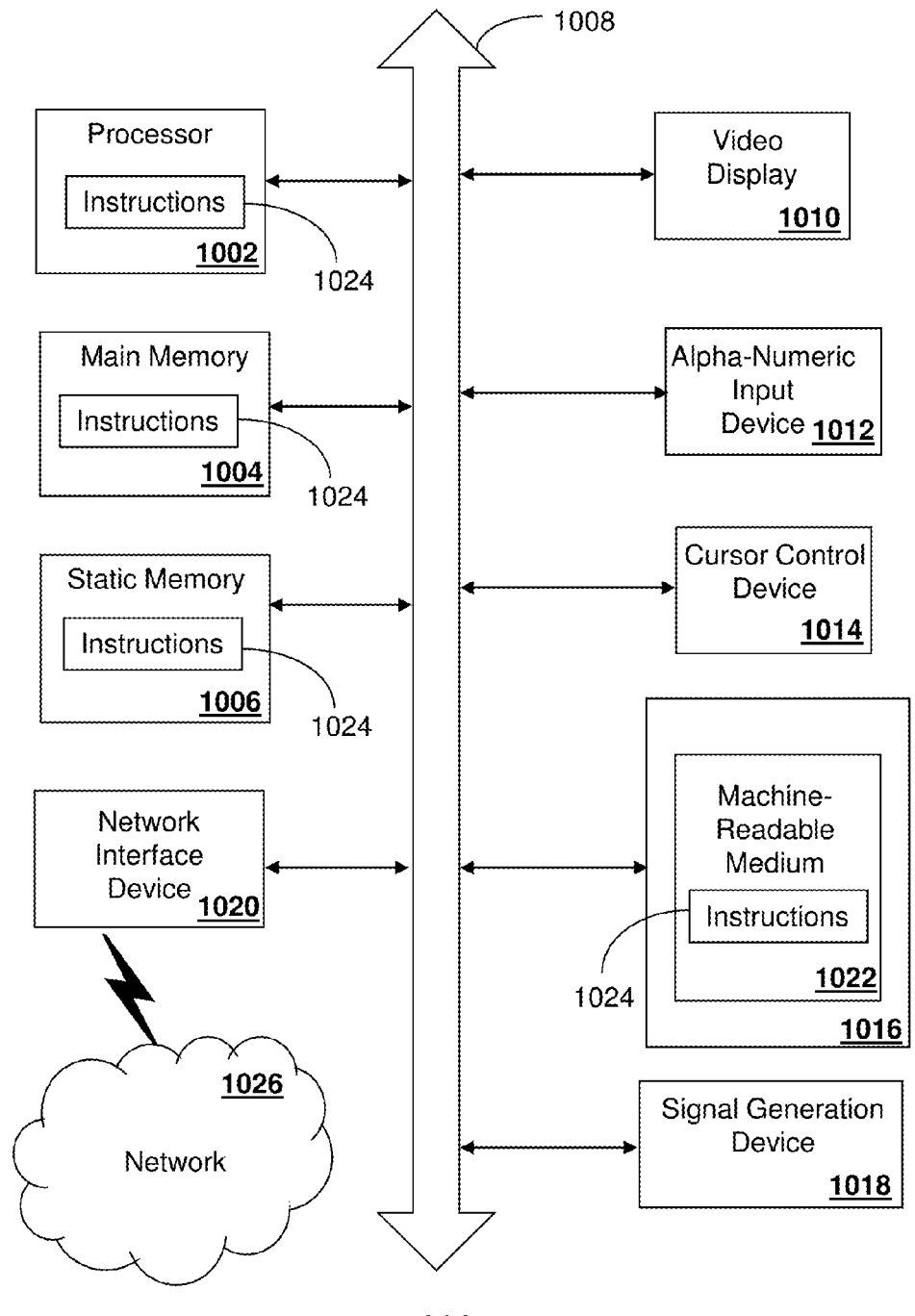
FIG. 10 is a diagrammatic representation of a machine in the form of a computer system within which a set of instructions, when executed, can cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. The machine can operate, for example, as the mobile device server 504, the media processor 506, the gateway 508, the remote server 512, the billing system 542, the content provider system 546, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device, comprising:
a memory comprising computer instructions; and
a controller coupled to the memory, wherein responsive to executing the computer instructions, the controller performs operations comprising:
receiving a software application and a first pairing key, the software application downloadable from a remote server, wherein the first pairing key is generated by a device of a service provider in response to a review of the software application for compliance with a policy of the service provider; and
executing a web server application in the portable communication device, wherein in accordance with executing the web server application, the operations further comprise:
detecting a media resource center when roaming in a communication zone of the media resource center, wherein the media resource center is operably coupled with one of a plurality of media devices including a media processor, or a gaming console;
facilitating communications with the media resource center; and
transmitting the first pairing key to the media resource center to enable a subset of a plurality of services associated with the software application to be used with a subset of the plurality of media devices and disable the subset of the plurality of services associated with the software application for a remainder of the plurality of media devices.

2. The portable communication device of claim 1, wherein voice communications are enabled on the portable communication device by equipment of the service provider, and wherein the review of the software application is performed by personnel of the service provider.

3. The portable communication device of claim 1, wherein the operations further comprise receiving a second pairing key associated with the software application, and wherein a plurality of services associated with the software application are enabled based on the second pairing key.

4. The portable communication device of claim 1, wherein the operations further comprise transmitting a third pairing key to the media resource center, wherein the media resource center authenticates the portable communication device based on the third pairing key.

5. The portable communication device of claim 4, wherein the third pairing key identifies a billing scheme, and wherein a charge is applied to a subscriber account associated with the portable communication device according to the billing scheme.

6. The portable communication device of claim 1, further comprising removable hardware configured to communicate with the controller, wherein the removable hardware processes a portion of the software application.

7. The portable communication device of claim 1, wherein in the receiving of the software application and the first pairing key, the controller receives the first pairing key prior to receiving the software application, and wherein the first pairing key is received by one of using removable hardware, or during manufacture of the portable communication device.

8. A non-transitory tangible computer-readable storage device in a mobile device server, the tangible computer-readable storage device comprising computer instructions which when executed by a processor cause the processor to perform operations comprising:
obtaining a software application;
storing a first pairing key in a memory of the mobile device server, wherein the first pairing key is generated by a device of a service provider in response to a review of the software application for compliance with a policy of the service provider;
executing a web server application at the mobile device server, wherein in accordance with executing the web server application, the operations further comprise:
detecting a media resource center when roaming in a communication zone of the media resource center, wherein the media resource center is operably coupled with one of a plurality of media devices including a media processor, or a gaming console;
facilitating communications with the media resource center; and
transmitting the first pairing key to the media resource center to enable a subset of a plurality of services associated with the software application to be used with a subset of the plurality of media devices and disable the subset of the plurality of services associated with the software application for a remainder of the plurality of media devices.

9. The non-transitory tangible computer-readable storage device of claim 8, wherein the operations further comprise enabling voice communications on the mobile device server, wherein the media resource center is detected when the mobile device server is roaming in a communication zone of an internet protocol television system gateway of the media resource center.

10. The non-transitory tangible computer-readable storage device of claim 8, wherein the operations further comprise storing the first pairing key in a removable memory device of the mobile device server.

11. The non-transitory tangible computer-readable storage device of claim 8, wherein the operations further comprise:
transmitting a second pairing key to the media resource center, wherein the media resource center authenticates the mobile device server based on the second pairing key, and wherein a charge is applied to a subscriber account associated with one of the mobile device server, or the media resource center based on a service plan determined from one of the first pairing key, or the second pairing key.

12. A method comprising:
receiving, by a portable communication device comprising a processor, a software application from a third party vendor, the software application being executable by the portable communication device, wherein the portable communication device comprises an executable web server application to provide a media service to a media device, wherein the software application implements the service to be used with the media device comprising one of a media processor, or a gaming console;
reviewing, by the portable communication device, the software application for compliance with a policy associated with a service provider; and
generating, by the portable communication device, a pairing key based on the reviewing of the software application, wherein the pairing key is utilized to authenticate the software application to be used with the media device, wherein the pairing key is generated by a server; and
providing, by the portable communication device, the pairing key to the portable communication device and to a media resource center when the portable communication device is detected as roaming within a communication zone of the media resource center,
wherein the media resource center is operably coupled with a plurality of media devices, and wherein the pairing key enables a subset of a plurality of services associated with the software application to be used with a subset of a plurality of media devices and disables the subset of the plurality of services associated with the software application for a remainder of the plurality of media devices.

13. The method of claim 12, wherein the reviewing of the software application is performed by a compliance processor.

14. The method of claim 12, wherein the reviewing of the software application is based on information provided by an entity different from the service provider and the third party vendor, and wherein the information comprises an analysis of the software application.

15. The method of claim 12, wherein the reviewing of the software application is only performed after a pre-determined number of portable communication devices have selected to download the software application.

16. The method of claim 12,
wherein the media resource center is operably coupled with the media device, and wherein the media resource center is configured to authenticate the software application using the pairing key and to provide services via the media device.

* * * * *